March 7, 1967  J. E. ROSE  3,307,506
FIRE STARTING DEVICE
Filed March 8, 1963
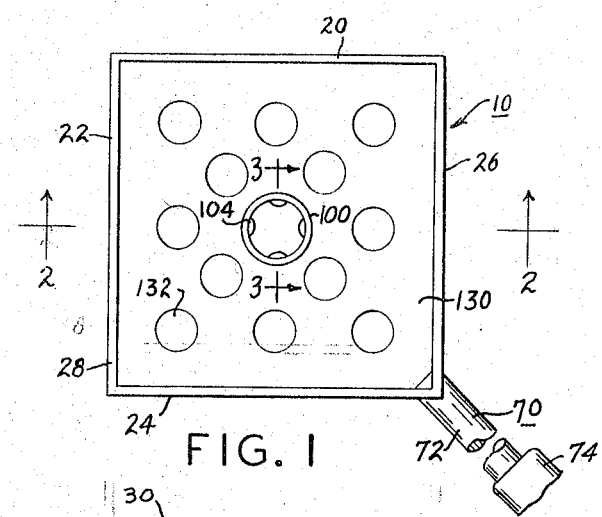
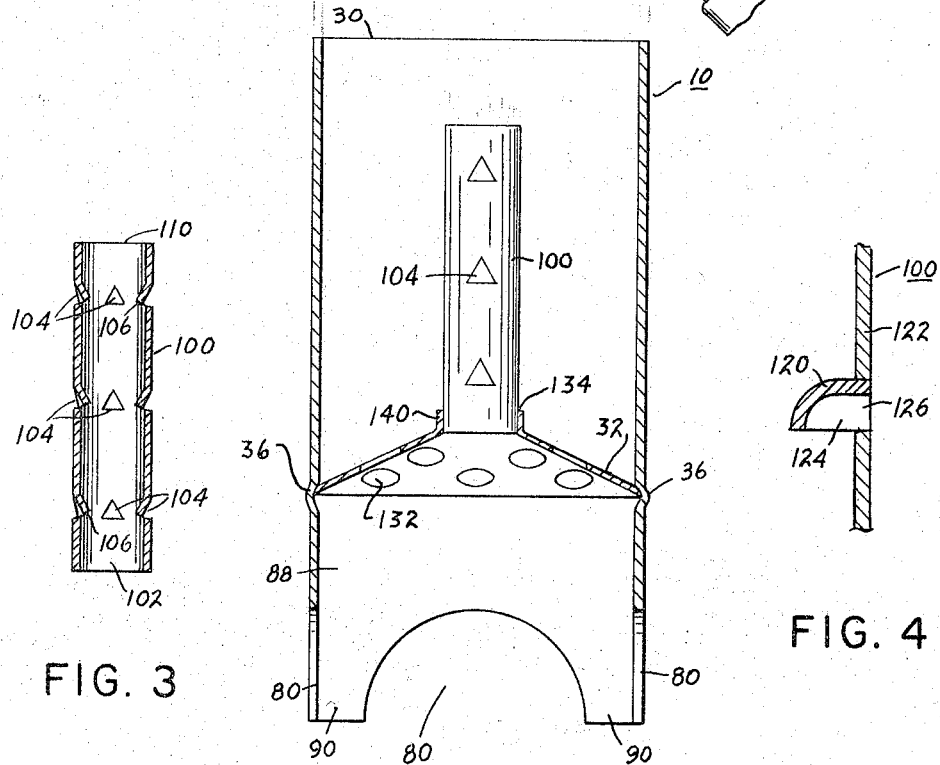
INVENTOR.
JACK EDWARD ROSE
BY Hobbs & Caton
ATTORNEYS

United States Patent Office 3,307,506
Patented Mar. 7, 1967

3,307,506
FIRE STARTING DEVICE
Jack E. Rose, 2931 Oak Manor Drive,
Elkhart, Ind. 46514
Filed Mar. 8, 1963, Ser. No. 263,944
5 Claims. (Cl. 110—1)

This application is a continuation-in-part of my copending application Serial No. 150,548, filed November 6, 1961, now abandoned.

The present invention relates to a fire starting device and more particularly to a device for use in starting charcoal fires and the like.

Outdoor cooking over charcoal fires has become exceedingly popular in the last few years, the cooking being done primarily on a small grill using only a relatively small amount of charcoal. Small charcoal briquettes of regular and uniform shape are extensively used in these grills and, once the charcoal is fully ignited, will burn continuously over a long period of time and will be consumed leaving only a small amount of ash; however, the briquette type charcoal is difficult to start and will provide a hot, effective fire only after it has been burning for some time. The long period required to start and obtain an effective fire often limits the use of the grill to leisurely evening, week end and holiday meals. Various type of starting devices, such as electrical heaters and mechanical blowers, have been tried, but these are often expensive and difficult to maintain in proper operating condition, or are inconvenient to use, handle and store. Compounds have been devised, such as oil saturated fibrous blocks or sheets which are placed in the grill surrounded by the charcoal, but these compounds often create unpleasant smoke and odors, and frequently leave a flavor on the food cooked on the charcoal started by the compound. It is therefore one of the principal objects of the present invention to provide a relatively simple, easily handled and operated device for starting charcoal fires, in which the charcoal is readily ignited and automatically fanned by a draft throughout a substantial area of the charcoal, to create a hot, effective fire in a short period of time, and which is so constructed that it can be effectively used to start fires of various sizes and with various materials without leaving any foreign substances on the charcoal after it is started.

Another object of the invention is to provide a charcoal starting device in which only the charcoal and common paper are used to create the fire, and which produces no unpleasant odors or smoke to interfere with the enjoyment of the grill.

Still another object of the invention is to provide a device for starting fires which is simple in construction and operation and which has no moving parts, for creating an effective draft for accelerating the starting operation.

A further object is to provide a device for starting charcoal fires and the like which effectively distributes the flame and heat from a pilot fire throughout a substantial area and at remote places and which provides these areas and places with adequate and effective draft after the fire is started to accelerate the creation of a hot controlled fire.

Another object of the invention is to provide a fire starting device of the aforesaid type which can be used to start a small amount of charcoal for use in igniting a bed of charcoal in the grill or which can be effectively used as a complete grill for roasting wieners and marshmallows and cooking and warming food for small meals and snacks.

Additional objects and advantages of the invention will become apparent from the following description and accompanying drawing, wherein:

FIGURE 1 is a top plan view of my fire starting device;

FIGURE 2 is a vertical cross sectional view of the device shown in FIGURE 1, taken on line 2—2 of the latter figure;

FIGURE 3 is an enlarged vertical cross sectional view of a portion of the internal mechanism of the device, the section being taken on line 3—3 of FIGURE 1; and FIGURE 4 is an enlarged cross sectional view illustrating a modification in the present invention.

Referring more specifically to the drawings, and to FIGURE 1 in particular, numeral 10 designates my fire starting device. Once the fire has been started in the fire starting device 10, the briquettes or other types of charcoal are transferred to the grill pit and spread evenly over the bottom surface thereof. The present fire starting device may be used in conjunction with a number of different and well known types of grills, barbecuing apparatus, and ovens, and may be operated entirely independently of these units until the fire is started and properly burning, after which the coals and burning charcoal are transferred thereto.

The present unit as shown in the drawings consists of four rectangularly shaped walls 20, 22, 24 and 26 joined integrally to one another to form a housing 28 having an open top 30. A grate 32 is mounted in the lower portion of the housing and is supported therein by lugs or outwardly extending groove 36 formed in the side walls of the housing. The grate may be of various shapes and designs, and is rigid and of sufficient strength to withstand prolonged high temperatures from the charcoal in the event the unit is used as a separate grill or heating device. Secured to one corner and rigidly attached to the housing is a handle 70 consisting of a steel shaft 72 and an insulating handle 74 of wood or other suitable material. Beneath the grate 32, side walls 20, 22, 24 and 26 contain large openings 80, for admitting air and for receiving the igniting material such as paper and the like in the space 88 beneath the grate. These openings in effect define four legs 90 on which the fire starting device rests.

One of the principal features of the present invention is the center tube 100 rigidly secured to and extending upwardly from grate 32. The grate is open beneath the tube so that air and flame from the starting material will be unrestricted in entering the tube and will flow freely therethrough after the fire is started. This tube consists of a cylindrical body portion 102 in which are provided a plurality of inwardly extending baffles 104 formed integrally with body portion 102 and extending inwardly sufficiently to scoop a substantial portion of the upwardly flowing air and flame from the tube through openings 106. The flame and air passing through openings 106 with substantial velocity are directed thereby in a substantially horizontal direction from openings 106 onto the charcoal briquettes placed in the housing. The top of the tube 110 is preferably open so that any charcoal placed thereabove will be ignited by the flame passing completely through the tube.

In using the present fire starting device, charcoal, for example charcoal briquettes, are placed in housing 28 completely surrounding tube 100 and preferably over the top thereof, and igniting material such as paper, oil saturated fibrous material, or a small container of fluid, is placed in compartment 88 beneath tube 100. When the material is fully ignited by a match or the like extended inwardly into chamber 88 through one of the openings in the side thereof, flame and hot air from the burning material pass upwardly through tube 100 and are scooped by baffles 104 through openings 106. The velocity of the upflowing hot air and flame is sufficient to be directed substantially laterally from openings 106 by the baffles 104, thus contacting a relatively large area in the charcoal around tube 100. It is thus seen that the flame and hot air passing upwardly through the tube and thence directed outwardly through openings 106 readily ignite the charcoal briquettes. After the charcoal has been ignited, air from openings 106 and that passing upwardly through openings in grate 32 provide sufficient draft to cause the briquettes to burn vigorously. The present unit may be used in this form as a heater, grill or stove; however, it is intended primarliy as a device for starting the fire for a grill. When it is used to start fires for a grill, the device is lifted by handle 74 after the charcoal is burning vigorously, and the burning charcoal is dumped into the grill pit and spread throughout the bottom area. Inasmuch as the charcoal pieces or briquettes will continue to burn once they have been ignited, an even, uniform bed of coals may be provided throughout the entire pit.

The pyramid-shaped grate 32 has a plurality of relatively large air holes 132 distributed throughout, and a center hole 134. The periphery of the grate is seated in an outwardly extending groove 36 extending completely around the housing for retaining the grate rigidly in place in the housing. The pyramid-shaped grate directs the flames from the starting material beneath the grate toward the center and into tube 100 where they will be most effective in bringing the charcoal to the required ignition temperature. Further, the relatively large holes in the grate permit ashes and other waste material to drop readily therefrom without permitting the charcoal briquettes to drop therethrough until they have become disintegrated from burning.

While only one embodiment of the present invention has been described herein, various changes may be made to suit requirements. For example, instead of employing cone-shaped baffles 104, an inwardly extending scoop 120 may be secured to the side wall 122 of the tube 100 as illustrated in FIGURE 4. This type of baffle or scoop has the advantage of providing a larger intake opening 124 and a directly laterally positioned opening 126 from which the flames will project substantially horizontally. This type of baffle and opening result in a somewhat larger area of charcoal being contact initially by the flames from the starting material. Other variations and modifications in both the tube and housing will occur to those skilled in the art.

I claim:

1. A fire starting device, comprising four rectangular walls forming a housing with an open top and a plurality of openings at the bottom of the side walls, a grate rigidly secured in said housing upwardly from the bottom thereof and flaring downwardly and outwardly from a circular cross section to a rectangular cross section in a smooth transition, said grate being disposed in said housing adjacent the upper edge of said side openings, a vertically positioned cylindrical tube with an open top and bottom secured at its bottom to the center of said grate, a plurality of vertically and circumferentially arranged holes through said tube, an inwardly and downwardly facing baffle over the inner side of each of said holes for directing upwardly flowing heated air in said tube through the respective holes and laterally from the external surface of said tube, and a handle rigidly secured to the side of said housing for inverting said device while hot.

2. A fire starting device, comprising four rectangular walls forming a housing with an open top and an opening adjacent the bottom of the side walls, a grate rigidly secured in said housing upwardly from the bottom thereof and flaring downwardly and outwardly from a circular cross section to a rectangular cross section in a smooth transition, a vertically positioned tube with an open bottom secured at its bottom to the center of said grate, a plurality of vertically and circumferentially arranged holes through said tube, an inwardly and downwardly facing baffle over the inner side of each of said holes for directing upwardly flowing heated air in said tube through the respective holes and laterally from the external surface of said tube, and a handle secured to the side of said housing for inverting said device while hot.

3. A fire starting device, comprising four rectangular walls forming a housing with an open top and an opening adjacent the bottom of the side walls, a grate rigidly secured in said housing upwardly from the bottom thereof and flaring downwardly and outwardly from a center opening to a rectangular cross section in a smooth transition, said grate being positioned in said housing adjacent the upper edge of said opening, a vertically positioned tube with an open bottom secured at its bottom to the center of said grate, a plurality of vertically and circumferentially arranged holes through said tube, and an inwardly and downwardly facing baffle over the inner side of each of said holes for directing upwardly flowing heated air in said tube through the respective holes and laterally from the external surface of said tube.

4. A fire starting device, comprising a housing with an open top and an opening adjacent the bottom, a grate rigidly secured in said housing upwardly from the bottom thereof and flaring downwardly and outwardly from a center opening to a rectangular cross section in a smooth transition, a tube with an open top and bottom secured at its bottom to said grate, a plurality of circumferentially arranged holes through said tube, and an inwardly and downwardly facing baffle over the inner side of each of said holes for directing upwardly flowing heated air in said tube through the respective holes and laterally from the external surface of said tube.

5. A fire starting device, comprising four rectangular walls forming a housing with an open top and an opening adjacent the bottom of the side walls, a sheet metal grate extending inwardly and upwardly toward the center and having a plurality of large holes therethrough with one of said holes at the center rigidly secured in said housing adjacent the upper edge of said opening, a vertically positioned tube with an open bottom secured at its bottom to said grate at said center hole, a plurality of vertically and circumferentially arranged holes through said tube, and an inwardly and downwardly facing baffle over the inner side of each of said holes for directing upwardly flowing heated air in said tube through the respective holes and laterally from the external surface of said tube.

References Cited by the Examiner

UNITED STATES PATENTS

| 101,676 | 4/1870 | Stevenson | 126—163 |
|---|---|---|---|
| 859,030 | 7/1907 | Walker et al. | |
| 1,840,137 | 1/1932 | Sturgis | 158—92 |
| 2,222,854 | 11/1940 | Reynolds | 158—91 |
| 2,518,689 | 4/1950 | Hoger. | |
| 2,711,310 | 6/1955 | Morrill | 263—19 |
| 3,062,200 | 11/1962 | Miller | 126—25 |

FOREIGN PATENTS 1,111   4/1869   Great Britain.

FREDERICK KETTERER, *Primary Examiner.*

FREDERICK L. MATTESON, JR.,
*Assistant Examiner.*